United States Patent
Hara et al.

(10) Patent No.: US 9,950,300 B2
(45) Date of Patent: Apr. 24, 2018

(54) POROUS POLYAMIDE HOLLOW FIBER MEMBRANE HAVING VERY SMALL PORE DIAMETER, AND METHOD FOR PRODUCING SAME

(71) Applicant: UNITIKA LTD., Hyogo (JP)

(72) Inventors: Yuki Hara, Kyoto (JP); Takahiro Ono, Kyoto (JP); Terumi Murata, Kyoto (JP); Kuniko Inoue, Kyoto (JP)

(73) Assignee: UNITIKA LTD., Hyogo (JP)

( * ) Notice: Subject to any disclaimer, the term of this patent is extended or adjusted under 35 U.S.C. 154(b) by 416 days.

(21) Appl. No.: 14/421,887

(22) PCT Filed: Aug. 14, 2013

(86) PCT No.: PCT/JP2013/071916
§ 371 (c)(1),
(2) Date: Feb. 20, 2015

(87) PCT Pub. No.: WO2014/030585
PCT Pub. Date: Feb. 27, 2014

(65) Prior Publication Data
US 2015/0209735 A1    Jul. 30, 2015

(30) Foreign Application Priority Data
Aug. 20, 2012 (JP) .................... 2012-181875

(51) Int. Cl.
*B01D 71/56* (2006.01)
*B01D 69/08* (2006.01)
(Continued)

(52) U.S. Cl.
CPC ............ *B01D 71/56* (2013.01); *B01D 61/14* (2013.01); *B01D 67/0016* (2013.01);
(Continued)

(58) Field of Classification Search
None
See application file for complete search history.

(56) References Cited

U.S. PATENT DOCUMENTS

| 4,247,498 A | 1/1981 | Castro |
| 4,340,479 A | 7/1982 | Pall |

(Continued)

FOREIGN PATENT DOCUMENTS

| CN | 101945695 | 1/2011 |
| JP | 57-105212 | 6/1982 |

(Continued)

OTHER PUBLICATIONS

Cha, B.J. et al., The effects of diluent molecular weight on the structure of thermally-induced phase separation membrane, Journal of Membrane Science 108 (1995), pp. 219-229.
(Continued)

*Primary Examiner* — Krishnan S Menon
*Assistant Examiner* — Bradley R Spies
(74) *Attorney, Agent, or Firm* — McDonald Hopkins LLC

(57) ABSTRACT

[Problem] The purpose of the present invention is to provide a polyamide hollow fiber membrane having such properties that the transmission of fine particles through the membrane can be prevented effectively, the membrane has an excellent water transmissibility, the entire surface of the membrane has excellent hydrophilicity, and impurities such as metal elements are rarely eluted through the membrane.
[Solution] A polyamide hollow fiber membrane produced by a TIPS method under specific production conditions has the following characteristic properties: (1) the contact angle of water on the surface of the membrane is 80° or less; (2) the external pressure water transmissibility of the membrane is 50 L/(m²·atm·h) or more; and (3) the 50 nm-particles blocking ratio of the membrane is 90% or more.

7 Claims, 2 Drawing Sheets

(51) Int. Cl.
  *B01D 69/02* (2006.01)
  *B01D 67/00* (2006.01)
  *C02F 1/44* (2006.01)
  *B01D 61/14* (2006.01)
  *C02F 1/00* (2006.01)
  *C02F 103/04* (2006.01)
  *C02F 103/34* (2006.01)

(52) U.S. Cl.
  CPC .............. *B01D 69/02* (2013.01); *B01D 69/08* (2013.01); *B01D 69/087* (2013.01); *C02F 1/44* (2013.01); *B01D 2323/12* (2013.01); *B01D 2323/42* (2013.01); *B01D 2325/20* (2013.01); *B01D 2325/36* (2013.01); *C02F 2103/04* (2013.01); *C02F 2103/343* (2013.01); *C02F 2103/346* (2013.01)

(56) References Cited

U.S. PATENT DOCUMENTS

| | | | |
|---|---|---|---|
| 4,477,598 A | 10/1984 | Kesting | |
| 2009/0166291 A1* | 7/2009 | Jackson | B01D 63/16 210/641 |
| 2011/0168628 A1 | 7/2011 | Matsuyama et al. | |
| 2012/0196345 A1* | 8/2012 | Zink | B01D 67/0088 435/181 |

FOREIGN PATENT DOCUMENTS

| | | |
|---|---|---|
| JP | 58-65009 | 4/1983 |
| JP | 2000001612 | 1/2000 |
| JP | 2005193193 | 7/2005 |
| JP | 2010104983 | 5/2010 |
| JP | 2010240535 | 10/2010 |
| JP | 2012020231 | 2/2012 |
| JP | 2012183501 | 9/2012 |
| WO | WO2010038414 | 4/2010 |

OTHER PUBLICATIONS

Patent Abstracts of Japan, Publication No. 2000001612, Nylon Composition, Nylon Porous Membrane and its Production, UBE Ind. Ltd., Jan. 7, 2000.

Patent Abstracts of Japan, Publication No. 2005193193, Semi-Aromatic Polyamide-Based Porous Membrane and its Production Method, Kuraray Co. Ltd., Jul. 21, 2005.

Patent Abstracts of Japan, Publication No. 2010-104983, Polyamide Hollow Fiber Film and Method for Producing the Same, UNITIKA Ltd. and Kobe Univ., May 13, 2010.

Patent Abstracts of Japan, Publication No. 2010-240535, Hollow Fiber Membrane and Method of Manufacturing Hollow Fiber Membrane, Oct. 28, 2010.

Patent Abstracts of Japan, Publication No. 2012-020231, Highly Permeable Hollow Fiber Membrane and Method of Producing the Same, UNITIKA Ltd., Feb. 2, 2012.

Patent Abstracts of Japan, Publication No. 2012-183501, Nylon Hollow Yarn Membrane Module and Production Method Thereof, Kitz Microfilter Corp., Sep. 27, 2012.

Yoshikawa, Masakazu et al., Membrane Technology Second Edition (Makugijutsu Dainihan), Industrial Publishing & Consulting, Inc., p. 95 (1997).

International Search Report, PCT/JP2013/071916, UNITIKA Ltd., dated Oct. 1, 2013.

* cited by examiner

POROUS POLYAMIDE HOLLOW FIBER MEMBRANE HAVING VERY SMALL PORE DIAMETER, AND METHOD FOR PRODUCING SAME

FIELD OF THE INVENTION

The present invention relates to a polyamide hollow fiber membrane with very small pore size, excellent water permeability, excellent separating ability, and excellent impurity trapping property, the surface of which has excellent hydrophilicity, and from which the elution of impurities such as metal elements is small, for use in the fields of semiconductor industry, food industry, pharmaceutical industry, medical industry, and the like, and a method for producing the polyamide hollow fiber membrane. Furthermore, the present invention relates to a hollow fiber membrane module including the polyamide hollow fiber membrane.

BACKGROUND OF THE INVENTION

In recent years, porous filtration membranes such as an ultrafiltration membrane and a microfiltration membrane have been increasingly used in many industrial fields such as: semiconductor industry, e.g., filtration of impurities in a resist solution; water treatment, e.g., drinking water production and water and wastewater treatment; medical field, e.g., blood purification; pharmaceutical field, e.g., virus removal; and food industry. Porous filtration membranes with various pore sizes have been developed. For example, in the semiconductor field, a remarkable improvement in the technique of making finer structures has led to an increasing demand for cleanliness of high-purity chemicals such as photoresist, cleaning liquid, and ultrapure water for use in the production of semiconductors, and this has led to higher demand for the ability of trapping fine particle impurities. Furthermore, in the pharmaceutical field, there has been increasing demand for virus removal and the use of virus removal membranes having a pore size of approximately 10 nm to 50 nm has been increased. In particular, a filtration membrane having a pore size on the order of nm to μm, which has been often used as a porous filtration membrane for trapping such fine particles, is produced using the phase separation of organic polymer solution in many cases. This technique is applicable to many organic polymer compounds and is easy to industrialize. Therefore, at present, this technique is mainly used in industrial production of filtration membranes.

The method for producing a porous filtration membrane can be roughly categorized into non-solvent induced phase separation (NIPS) and thermally induced phase separation (TIPS). In NIPS, a uniform polymer solution undergoes phase separation through the addition of a non-solvent. On the other hand, TIPS is a relatively new method, by which phase separation is induced by cooling a uniform polymer solution, obtained by dissolving a polymer at high temperature, to a temperature equal to or lower than the binodal line that is a boundary between the one phase region and the two phase region, and the structure is fixed by crystallization or glass transition of the polymer.

Conventionally, in many cases, porous filtration membranes have been usually made from polyolefin such as polyethylene or polypropylene, polyvinylidene fluoride, polysulfone, polyether sulfone, polyacrylonitrile, cellulose acetate, or the like. However, polyolefin, polyvinylidene fluoride, polysulfone, polyether sulfone, and the like have problems in that they are highly hydrophobic and thus reduce the flow of water, and that they have properties of adsorbing hydrophobic substances such as proteins and thus readily foul and cause a reduction of water permeability in the case of a liquid containing a large amount of hydrophobic substances. In the fields of pharmaceutical and food industries, there have been serious problems in that the adsorption of proteins leads to loss of useful proteins, change in flavor, and the like. On the other hand, as for hydrophilic impurities, polyolefin, polyvinylidene fluoride, polysulfone, polyether sulfone, and the like have a problem in that they are poor at trapping hydrophilic impurities, and therefore, in the case where a target to be removed is a hydrophilic substance, they have a low impurity removing property. On the other hand, polyacrylonitrile, cellulose acetate, and the like are relatively highly hydrophilic resins. However, they have problems in that they have a low membrane strength, and are susceptible to high temperatures, and to chemicals and thus they can be used only within a very small range of temperatures and pHs.

Under such circumstances, study has been conducted on a method for producing a porous membrane from a relatively-highly hydrophilic, highly-chemically-resistant polyamide resin. However, polyamide is only soluble in formic acid, concentrated sulfuric acid, and expensive fluorine-containing solvents, which are strong acids, at room temperature. Therefore, in the methods using NIPS, these solvents have been used. For example, the methods disclosed in Patent Documents 1 to 4 are membrane forming methods using formic acid as a solvent. However, these methods are problematic in safety and health. Furthermore, Patent Document 5 discloses a method of: casting a solution obtained by dissolving a mixture of polyamide 6 and polycaprolactone in hexafluoroisopropanol: and extracting caprolactone from the cast product to thereby making it porous. However, the solvent used and the polymer to be extracted and removed are both expensive, and this method is not practical.

On the other hand, a method using TIPS has also been studied. Non-patent Document 1 reportedly proves that it is possible to prepare a porous membrane from a system of polyamide 12 and polyethylene glycol. Furthermore, Patent Document 6 reportedly proves that it is possible to prepare a porous membrane from a system of polyamide 11 and ethylene carbonate, propylene carbonate, or sulfolane. Furthermore, Non-patent Document 2 describes that it is possible to prepare a porous membrane of polyamide 6 and polyamide 12 by using triethylene glycol as a solvent. However, all these methods just made it possible to form a porous membrane, and did not make it possible to process the membrane into a highly-water-permeable hollow fiber membrane and control the size of micropores.

In view of the circumstances, the present inventors have earnestly conducted a study on a polyamide hollow fiber membrane and a method for producing the polyamide hollow fiber membrane. As a result, the inventors have found that it is possible to prepare a polyamide hollow fiber membrane having excellent properties such as high hydrophilicity, water permeability, separating ability, strength, and the like, by forming the membrane by TIPS using a certain limited solvent as a solvent for membrane formation. This technique is disclosed in Patent Documents 7 and 8. However, according to the technique of Patent Documents 7 and 8, the pore size in the surface of the resulting polyamide hollow fiber membrane is as large as 100 μm. Therefore, the technique cannot satisfy the demand for a hollow fiber membrane with smaller pores, and needs further improvement.

Furthermore, most resins such as polyolefin usually contain a minute amount of catalyst that was used for polymerization, and contain additives such as a lubricant that was used for lubricating resin pellets when the pellets were inserted. Although these impurities are contained in minute amounts, there is a problem in that they may contaminate a separate liquid as an eluted material when the membrane is used as a hollow fiber membrane. Therefore, such a hollow fiber membrane has been sometimes difficult to use in semiconductor and pharmaceutical industries.

PRIOR ART DOCUMENTS

Patent Documents

Patent Document 1: Japanese Patent Laid-Open Publication No. SHO57-105212;
Patent Document 2: Japanese Patent Laid-Open Publication No. SHO58-65009;
Patent Document 3: U.S. Pat. No. 4,340,479;
Patent Document 4: U.S. Pat. No. 4,477,598;
Patent Document 5: Japanese Patent Laid-Open Publication No. 2000-1612;
Patent Document 6: U.S. Pat. No. 4,247,498;
Patent Document 7: Japanese Patent Laid-Open Publication No. 2010-104983; and
Patent Document 8: Japanese Patent Laid-Open Publication No. 2012-20231.

Non-Patent Documents

Non-patent Document 1: Journal of membrane science 108, 219-229 (1995).
Non-patent Document 2: "Membrane Technology Second Edition (*Makugijutsu Dainihan*)", written by Marcel Mulder, edited by Masakazu Yoshikawa, Tsuyoshi Matsuura, and Tsutomu Nakagawa, issued by Industrial Publishing & Consulting, Inc., pp. 95 (1997).

SUMMARY OF THE INVENTION

Problems to be Solved by the Invention

A technical objective of the present invention is to solve the problems described above and to provide a polyamide hollow fiber membrane which can effectively prevent fine particles from passing through the membrane, has a high water permeability and has a highly hydrophilic surface, and from which the elution of impurities such as metal elements is small.

Means for Solving the Problem

The inventors have earnestly conducted a study in order to attain the above-described objective. As a result, the inventors have found that it is possible to cause a polyamide hollow fiber membrane to have the following properties: (1) the contact angle between water and the surface of the polyamide hollow fiber membrane is not more than 80°; (2) the water permeability under external pressure is not less than 50 L/(m$^2$·atm·h); and (3) the 50 nm particle blocking rate is not less than 90%, by producing the polyamide hollow fiber membrane under certain production conditions using TIPS, specifically, through the following First to Third Steps:

First Step: Prepare a liquid for membrane formation by dissolving, at a concentration of 21 to 35 mass %, a polyamide resin having methylene and amide groups at a molar ratio of —$CH_2$—:—NHCO—=4:1 to 10:1 in an organic solvent that has a boiling point of 150° C. or higher and is not miscible with the polyamide resin at temperatures lower than 100° C.;

Second Step: Form a hollow fiber membrane with the use of a double-pipe nozzle for hollow fiber production having a double-pipe structure, by discharging the liquid for membrane formation from an outer annular nozzle and discharging an inner fluid from an inner nozzle, and immersing the discharged product in a coagulation bath containing a polyhydric alcohol or a mixture of a polyhydric alcohol and water; and Third Step: Remove the organic solvent from the hollow fiber membrane formed in the Second Step.

The present invention has been accomplished by a further study on the basis of this finding. Specifically, the present invention provides a polyamide hollow fiber membrane, a method for producing a polyamide hollow fiber membrane, and a hollow fiber membrane module, which have the following aspects.

Item 1. A polyamide hollow fiber membrane having the following properties (1) to (4):
 (1) the polyamide hollow fiber membrane contains a polyamide resin having methylene and amide groups at a molar ratio of —$CH_2$—:—NHCO—=4:1 to 10:1;
 (2) the contact angle between water and the surface of the polyamide hollow fiber membrane is not more than 80°;
 (3) the water permeability under external pressure is not less than 50 L/(m$^2$·atm·h); and
 (4) the 50 nm particle blocking rate is not less than 90%.

Item 2. The polyamide hollow fiber membrane according to item 1, wherein the polyamide resin is at least one selected from the group consisting of polyamide 6, polyamide 66, polyamide 46, polyamide 610, polyamide 11, and polyamide MXD6.

Item 3. The polyamide hollow fiber membrane according to item 1, which has a 5 nm particle blocking rate of not less than 90%.

Item 4. The polyamide hollow fiber membrane according to any of items 1 to 3, which has a water permeability under external pressure of not less than 150 L/(m$^2$·atm·h) and a 10 nm particle blocking rate of not less than 90%.

Item 5. The polyamide hollow fiber membrane according to any of items 1 to 3, which has a water permeability under external pressure of not less than 250 L/(m$^2$·at·h) and a 20 nm particle blocking rate of not less than 90%.

Item 6. The polyamide hollow fiber membrane according to any of items 1 to 5, wherein the metal element content for each metal element is not more than 10 ppm.

Item 7. A hollow fiber membrane module including: a module case; and the polyamide hollow fiber membrane described in any of items 1 to 6 stored in the module case.

Item 8. A method for producing a polyamide hollow fiber membrane, including the following steps 1 to 3:
 1) preparing a liquid for membrane formation by dissolving, at a concentration of 21 to 35 mass %, a polyamide resin having methylene and amide groups at a molar ratio of —$CH_2$—:—NHCO—=4:1 to 10:1 in an organic solvent that has a boiling point of 150° C. or higher and is not miscible with the polyamide resin at temperatures lower than 100° C.;
 2) forming a hollow fiber membrane with the use of a double-pipe nozzle for hollow fiber production having a double-pipe structure, by discharging the liquid for membrane formation from an outer annular nozzle and discharging an inner fluid from an inner nozzle, and immersing the discharged product in a coagulation bath containing a polyhydric alcohol or a mixture of a polyhydric alcohol and water; and 3) removing the organic solvent from the hollow fiber membrane formed in step 2.

Item 9. The method according to item 8, wherein, in step 1, the organic solvent used for preparation of the liquid for membrane formation is an aprotic polar solvent.

Item 10. The method according to item 9, wherein the aprotic polar solvent is at least one selected from sulfolane, dimethylsulfone, γ-butyrolactone, δ-valerolactone, ε-caprolactone, ethylene carbonate, and propylene carbonate.

Advantages of the Invention

A polyamide hollow fiber membrane of the present invention provides a hollow fiber membrane module which is highly hydrophilic, which can remove fine particles, from which the elution of metal elements and the like is small, and which can be used for treatment at a high flow rate. Furthermore, the polyamide hollow fiber membrane of the present invention has hydrogen bonds and hydrophilic interaction derived from a specific polyamide and thus has the effect of specifically adsorbing and removing impurities composed of hydrophilic components, and barely adsorbs hydrophobic components and thus has the effect of suppressing flow reduction. Therefore, the polyamide hollow fiber membrane of the present invention is suitably usable in the fields of semiconductor industry, food industry, pharmaceutical industry, medical industry, and the like.

EMBODIMENTS OF THE INVENTION

1. Polyamide Hollow Fiber Membrane

Figure 1:
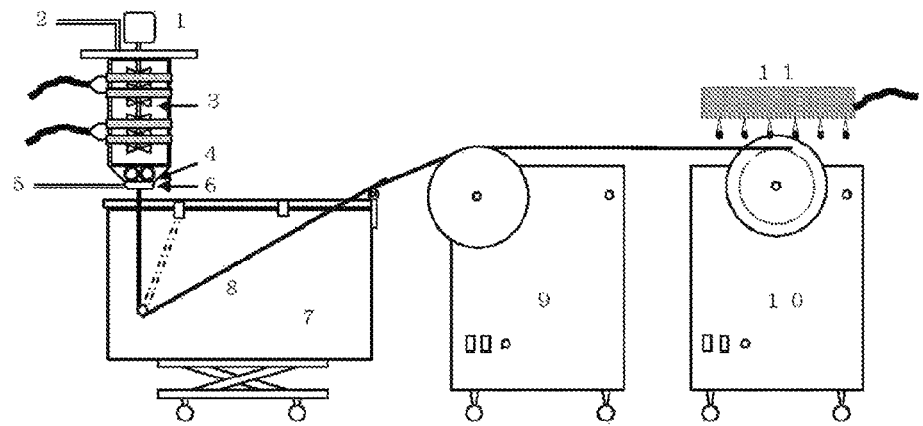
FIG. 1 schematically illustrates an apparatus to measure the water permeability under external pressure of a polyamide hollow fiber membrane of the present invention.

A polyamide hollow fiber membrane of the present invention is characterized in that (1) the polyamide hollow fiber membrane contains a polyamide resin having methylene and amide groups at a molar ratio of —$CH_2$—:—NHCO—=4:1 to 10:1, (2) the contact angle between water and the surface of the polyamide hollow fiber membrane is not more than 80°, (3) the water permeability under external pressure is not less than 50 L/($m^2$·atm·h), and (4) the 50 nm particle blocking rate is not less than 90%. The following description discusses the polyamide hollow fiber membrane of the present invention in detail.

A polyamide hollow fiber membrane of the present invention is constituted by a polyamide resin having methylene and amide groups at a molar ratio of —$CH_2$—:—NHCO—=4:1 to 10:1. The use of such a polyamide resin makes it possible to form a highly hydrophilic hollow fiber membrane that has a desired micropore size. The molar ratio of methylene groups to amide groups in the polyamide resin is, in view of a further increase in hydrophilicity and more effective formation of pores of small sizes, for example, preferably —$CH_2$—:—NHCO—=4:1 to 7:1, more preferably —$CH_2$—:—NHCO—=4:1 to 5:1. It should be noted that, in the present invention, the —CH— groups and —C= groups of polyamides containing aromatic rings are regarded as —$CH_2$— groups when the molar ratio of methylene groups is calculated.

Specific examples of the polyamide resin for use in the present invention include polyamide 6, polyamide 66, polyamide 46, polyamide 610, polyamide 11, polyamide MXD6, and the like. Among these polyamide resins, preferred are polyamide 6, polyamide 46, polyamide 610, and polyamide MXD6. In the present invention, the polyamide hollow fiber membrane may be constituted by a single polyamide resin or may be constituted by a blended polymer of two or more polyamide resins.

The polyamide resin for use in the present invention may or may not be crosslinked, provided that the polyamide resin can be formed into the shape of a fiber. In view of cost reduction, a polyamide resin which is not crosslinked is preferable.

The polyamide resin for use in the present invention is preferably synthesized without using a metal-containing polymerization catalyst. Furthermore, it is preferable that the polyamide resin does not contain additives such as an antioxidant, a lubricant, a hydrolysis inhibitor, a capping agent, a plasticizer, or a polymerization initiator. The use of such a polyamide resin makes it possible to dramatically reduce the elution of impurities when the polyamide hollow fiber membrane of the present invention is used as a filtration membrane. In view of this, suitable examples of the polyamide resin for use in the present invention include polyamide 6, polyamide 11, and the like which are obtained by ring-opening polymerization using water as a polymerization initiator.

The relative viscosity of the polyamide resin is not particularly limited, including, for example 2.0 to 6.2, preferably 3.0 to 5.5. A polyamide resin having such a relative viscosity is readily formed into a hollow fiber membrane and its phase separation is easy to control. In this specification, the relative viscosity is a value obtained by: dissolving a polyamide resin in 96% sulfuric acid at a concentration of 1 g/dl; and measuring the relative viscosity at 25° C. with the use of an Ubbelohde viscometer.

The surface of the polyamide hollow fiber membrane of the present invention is highly hydrophilic. The contact angle between water and the surface of the membrane is not more than 80°. The contact angle between water and the surface of the membrane is, for example, preferably not more than 70°, more preferably 40° to 65°. In this specification, the contact angle to water is a value obtained by: bringing a 1.8 µl droplet of pure water into gentle contact with the surface of the membrane; and measuring the angle between the surface of the membrane and the tangent to the droplet on the surface of the membrane at an end of the droplet with the use of a contact angle meter by the θ/2 method. That is, it can be said that the smaller this value is, the higher the hydrophilicity is expected.

The polyamide hollow fiber membrane of the present invention has such a property that the contact angle between the surface and water is not more than 80°, and therefore is capable of suppressing the adsorption of hydrophobic substances and preventing a reduction in its filtering performance within a short period of time. Furthermore, since the polyamide hollow fiber membrane has the above-described contact angle, even in the case where a dry polyamide hollow fiber membrane of the present invention is used for filtration of water, it is possible to suppress water from being repelled by surface tension when water is to pass through the membrane. Moreover, since the polyamide hollow fiber membrane of the present invention has a contact angle of this range, it is possible to specifically adsorb and remove hydrophilic impurities during the filtration in an organic solvent system.

Furthermore, the polyamide hollow fiber membrane of the present invention has, as one permeation property, a water permeability under external pressure of not less than 50 L/(m$^2$·atm·h) and not more than 2500 L/(m$^2$·atm·h). The water permeability under external pressure varies also depending on pore size. However, in the case of a hollow fiber membrane capable of blocking 90% or more of 5 nm particles, the water permeability under external pressure is preferably not less than 50 L/(m$^2$·atm·h), more preferably not less than 100 L/(m$^2$·atm·h). In the case of a hollow fiber membrane capable of passing 10% or more of 5 nm particles but blocking 90% or more of 10 nm particles, the water permeability under external pressure is preferably not less than 150 L/(m$^2$·atm·h), more preferably not less than 200 L/(m$^2$·atm·h). In the case of a hollow fiber membrane capable of passing 10% or more of 10 nm particles but blocking 90% or more of 20 nm particles, the water permeability under external pressure is preferably not less than 250 L/(m$^2$·atm·h), more preferably not less than 350 L/(m$^2$·atm·h). In the case of a hollow fiber membrane capable of passing 10% or more of 20 nm particles but blocking 90% or more of 50 nm particles, the water permeability under external pressure is preferably not less than 500 L/(m$^2$·atm·h), more preferably not less than 1000 L/(m$^2$·atm·h). Since the polyamide hollow fiber membrane of the present invention is highly water permeable under external pressure like above, it is possible to increase the flow rate of a liquid to be treated and thus possible to increase filtration efficiency.

In this specification, the water permeability under external pressure of the polyamide hollow fiber membrane is a value measured by external pressure filtration. Specifically, the water permeability under external pressure is a value obtained by: cutting the polyamide hollow fiber membrane into a length of 9 to 12 cm; inserting, into the hollow portion at both ends, injection needles having a diameter that fits the inside diameter; sealing one of the injection needles with a cap 20; connecting the other of the injection needles with an exit opening 21; setting this in an apparatus as illustrated in FIG. 1; and thereafter passing pure water with a liquid pump 14 for a predetermined period (time) while keeping the pressure at a constant pressure of 0.05 MPa by adjusting a valve of an outlet valve 18; measuring, as a permeate flow rate, the amount (L) of water that had passed through the membrane and puddled in a receiving tray 19; and finding the water permeability under external pressure through the following equation. It should be noted that the inlet pressure is measured with an inlet pressure meter 15 illustrated in FIG. 3, and the outlet pressure is measured with an outlet pressure meter 17 illustrated in FIG. 3.

Water permeability under external pressure=Permeate flow rate (L)/[Outside diameter (m)×3.14×Length (m)×{(Inlet pressure (atm)+Outlet pressure (atm))/2}×Time (h)].

Furthermore, the polyamide hollow fiber membrane of the present invention has, as a filtration property, a 50 nm particle blocking rate of not less than 90%. The 50 nm particle blocking rate of the polyamide hollow fiber membrane of the present invention is, for example, preferably not less than 95%, more preferably not less than 99%.

As a suitable example of the filtration property of the polyamide hollow fiber membrane of the present invention, the 20 nm particle blocking rate is not less than 90%, preferably not less than 95%, even more preferably not less than 99%. Furthermore, as a more suitable example of the filtration property of the polyamide hollow fiber membrane of the present invention, the 10 nm particle blocking rate is not less than 90%, preferably not less than 95%, even more preferably not less than 99%. In particular, as an even more suitable example of the filtration property of the polyamide hollow fiber membrane of the present invention, the 10 nm particle blocking rate is not less than 90%, preferably not less than 95%, even more preferably not less than 99%. As described above, the polyamide hollow fiber membrane of the present invention has a porous structure that can separate very small particles, and thus is capable of removing fine particles.

In this specification, the rate of blocking particles of each size is calculated from the percentage of colloidal gold particles removed in the case where a filtration test is performed using colloidal gold particles having a certain mean particle size. Since colloidal gold particles have a very narrow distribution of particle size, the filtration test using colloidal gold accurately reflects the particle blocking rate of the hollow fiber membrane. Specifically, the filtration test using colloidal gold particles is performed by: adding 2 mmol/l tris(hydroxymethyl)aminomethane to an aqueous dispersion containing 10 ppm colloidal gold having a certain mean particle size; performing dead-end filtration at constant pressure under the conditions in which the filtration pressure is 0.3 MPa and the filtration temperature is 25° C.; taking a portion of filtrate every time the amount of filtrate increases by 0.005 (m$^3$/m$^2$); measuring the absorbance of the second portion at a wavelength of 524 nm; and calculating the rate of blocking particles of each size through the following equation.

Particle blocking rate (%)={(Absorbance of liquid to be filtered−Absorbance of filtrate)/Absorbance of liquid to be filtered}×100

The breaking strength of the polyamide hollow fiber membrane of the present invention is not particularly limited, and is for example 5 to 30 MPa, preferably 7 to 25 MPa, more preferably 9 to 20 MPa. The elongation at break of the polyamide hollow fiber membrane of the present invention is also not particularly limited, and is for example 50 to 300%, preferably 80 to 250%, more preferably 100 to 230%. The tensile modulus of the polyamide hollow fiber membrane of the present invention is also not particularly limited, and is for example 50 to 250 MPa, preferably 50 to 200 MPa, more preferably 70 to 170 MPa. In this specification, breaking strength, elongation at break, and tensile modulus are values measured in accordance with JIS L-1013 under the conditions in which the length of a sample is 50 mm, tension speed is 50 mm/min, and the number of measured samples is n=5.

The inside diameter and outside diameter of the polyamide hollow fiber membrane of the present invention are not particularly limited, and are adjusted appropriately depending on the purpose and the like. The inside diameter is, for example, 800 to 100 μm, preferably 600 to 150 μm, more preferably 450 to 200 μm. The outside diameter is, for example, 1800 to 250 μm, preferably 1500 to 300 μm, more preferably 1000 to 400 μm.

The metal content for each metal element of the polyamide hollow fiber membrane of the present invention is, for example, not more than 10 ppm for each metal element, preferably not more than 5 ppm for each metal element, more preferably not more than 1 ppm for each metal element. Since the amount of impurities such as metal elements in the polyamide hollow fiber membrane of the present invention is small as described above, the elution of impurities is very small when the polyamide hollow fiber membrane is used as a filtration membrane. Examples of metal here include: Ag, Al, As, Au, B, Ba, Be, Bi, Ca, Cd, Ce, Co, Cr, Cu, Dy, Er, Eu, Fe, Ga, Gd, Ge, Hf, Hg, Ho, In, Ir, K, La, Li, Lu, Mg, Mn, Mo, Na, Nb, Nd, Ni, P, Pb, Pd, Pr, Pt, Re, Rh, Ru, Sb, Sc, Se, Si, Sm, Sn, Sr, Ta, Tb, Te, Ti, Tl, Tm, V, W, Y, Yb, Zn, and Zr.

The metal content of the polyamide hollow fiber membrane of the present invention is a value obtained by: dissolving a dry sample of a hollow fiber membrane in a solvent that dissolves polyamide at room temperature such as nitric acid, sulfuric acid, formic acid, or trichloroacetic acid; and measuring the solution by inductively coupled plasma (ICP)-atomic emission spectroscopy.

2. Method for Producing Polyamide Hollow Fiber Membrane

A polyamide hollow fiber membrane of the present invention can be produced by employing certain production conditions using TIPS. Specifically, the polyamide hollow fiber membrane of the present invention is produced through the following First to Third Steps.

First Step: Prepare a liquid for membrane formation by dissolving, at a concentration of 21 to 35 mass %, a polyamide resin having methylene and amide groups at a molar ratio of —$CH_2$—:—NHCO—=4:1 to 10:1 in an organic solvent that has a boiling point of 150° C. or higher and is not miscible with the polyamide resin at temperatures lower than 100° C.

Second Step: Form a hollow fiber membrane with the use of a double-pipe nozzle for hollow fiber production having a double-pipe structure, by: discharging the liquid for membrane formation from the outer annular nozzle and discharging an inner fluid from the inner nozzle; and immersing the discharged product in a coagulation bath containing a polyhydric alcohol or a mixture of a polyhydric alcohol and water.

Third Step: Remove the organic solvent from the hollow fiber membrane formed in Second Step.

The following description discusses each step of the method for producing a polyamide hollow fiber membrane of the present invention in detail.

First Step

In the First Step, a liquid for membrane formation is prepared by dissolving, at a concentration of 21 to 35 mass %, a polyamide resin having methylene and amide groups at a molar ratio of —$CH_2$—:—NHCO—=4:1 to 10:1 in an organic solvent that has a boiling point of 150° C. or higher and is not miscible with the polyamide resin at temperatures lower than 100° C.

Examples of the organic solvent that has a boiling point of 150° C. or higher and is not miscible with the polyamide resin at temperatures lower than 100° C. include aprotic polar solvents, glycerol esters, glycols, organic acids and organic esters, higher alcohols, glycols, and the like. Specific examples of aprotic polar solvents include sulfolane, dimethylsulfone, dimethylsulfoxide, γ-butyrolactone, δ-valerolactone, ε-caprolactone, N,N-dimethylformamide, N,N-dimethylacetamide, N-methyl-2-pyrrolidone, ethylene carbonate, propylene carbonate, and the like. Specific examples of glycerol esters include diethylene glycol dimethyl ether, diethylene glycol diethyl ether, triethylene glycol dimethyl ether, diethylene glycol dibutyl ether, tetraethylene glycol dimethyl ether, and the like. Specific examples of glycols include glycerin, ethylene glycol, diethylene glycol, triethylene glycol, tetraethylene glycol, propylene glycol, butylene glycol, hexylene glycol, polyethylene glycol (molecular weight 100 to 600), 1,3-butanediol, and the like. Specific examples of organic acids and organic esters include dimethyl phthalate, diethyl phthalate, diisopropyl phthalate, dibutyl phthalate, butyl benzyl phthalate, methyl salicylate, oleic acid, palmitic acid, stearic acid, lauric acid, and the like. In view of obtaining a high-strength, homogeneous polyamide hollow fiber membrane having a very small pore size, preferred are aprotic polar solvents, more preferred are sulfolane, dimethylsulfone, γ-butyrolactone, δ-valerolactone, ε-caprolactone, ethylene carbonate, and propylene carbonate, particularly preferred are sulfolane and dimethylsulfone. These organic solvents may be used individually or two or more of them may be used in combination.

Of the organic solvents listed above, a mixture of sulfolane and dimethylsulfone is particularly useful for the formation of pores having a very small size, and is suitable for use in the present invention. In the case where a mixture of sulfolane and dimethylsulfone is used, the mixing ratio is, for example, as follows: the mass ratio of sulfolane:dimethylsulfone is 100:50 to 100:1000, preferably 100:100 to 100:500, more preferably 100:200 to 100:400.

These organic solvents may contain a thickener, a surfactant, an amide additive, and/or the like depending on need, for the purpose of controlling pore size or improving the performance of the polyamide hollow fiber membrane.

The concentration of a solution obtained by dissolving a polyamide resin in the above-described organic solvent may be adjusted within the range of 21 to 35 mass %. The concentration is preferably 21 to 30 mass %, more preferably 23 to 28 mass %. In the case where such a concentration range is satisfied, the earlier-described ranges of the water permeability under external pressure and particle blocking rate are satisfied.

Furthermore, when the polyamide resin is dissolved in the organic solvent, the temperature of the solvent needs to be adjusted to 100° C. or higher. Specifically, the polyamide resin is preferably dissolved in the organic solvent at a temperature 10° C. to 50° C. higher than the phase separation temperature of that system, preferably at a temperature 20° C. to 40° C. higher than the phase separation temperature. The phase separation temperature of the system means a temperature at which, when a mixture obtained by mixing the resin and the solvent at very high temperature is gradually cooled, and liquid-liquid phase separation or solid-liquid phase separation due to separated crystals occurs. The phase separation temperature can be suitably measured with the use of, for example, a microscope with a hot stage.

Second Step

In the Second Step, a hollow fiber membrane is formed with the use of a double-pipe nozzle for hollow fiber production having a double-pipe structure, by: discharging the liquid for membrane formation from the outer annular nozzle and discharging an inner fluid from the inner nozzle; and immersing the discharged product in a coagulation bath containing a polyhydric alcohol or a mixture of a polyhydric alcohol and water.

Figure 2:
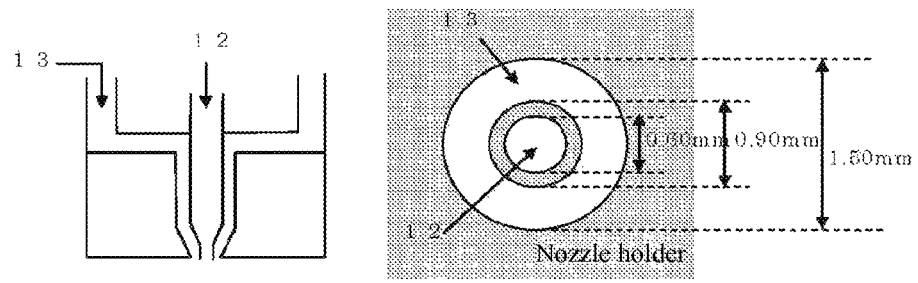
FIG. 2 illustrates the structure of a cross section of a double-pipe nozzle for hollow fiber production (spinneret) for production of the hollow fiber membrane of the present invention.

The double-pipe nozzle for hollow fiber production used here may be a spinneret having a double annular structure, such as those for use in the production of sheath-core composite fibers by melt spinning. FIG. 2 illustrates one example of the structure of a cross section of the double-pipe nozzle for hollow fiber production. The diameter of the outer annular nozzle of the double-pipe nozzle for hollow fiber production and the diameter of the inner nozzle of the double-pipe nozzle for hollow fiber production may be adjusted appropriately depending on the inside diameter and outside diameter of the polyamide hollow fiber membrane.

In the Second Step, the inner fluid to be discharged from the inner nozzle of the double-pipe nozzle for hollow fiber production may be in the form of a liquid or a gas, provided that the inner fluid is inert to the polyamide resin. The fluid in the form of a liquid is suitably used, because the liquid allows for spinning even under the conditions in which the liquid for membrane formation has a low viscosity and it is difficult to form a yarn. The liquid for use as the inner fluid is not limited to a particular kind, provided that the liquid is inert to the polyamide resin. In the case where the pores in the inside surface of the polyamide hollow fiber are desired to be large, a good solvent that has a high affinity for the polyamide resin may be used. In the case where the pores in the surface inside the polyamide hollow fiber are desired to be small, a poor solvent may be used. Specific examples of the good solvent include glycerin, diethylene glycol, triethylene glycol, tetraethylene glycol, polyethylene glycol 200, γ-butyrolactone, ε-caprolactone, propylene glycol, benzyl alcohol, 1,3-butanediol, sulfolane, and the like. Specific examples of the poor solvent include polyethylene glycol (300 to 600), higher fatty acids, liquid paraffin, and the like. These solvents may be used individually, or two or more of them may be used in combination. On the other hand, in the case where the viscosity of the liquid for membrane formation is high and spinnability is good, a method by which to inject a gas such as an inert gas may be employed.

Of the inner fluids listed above, glycerin, 1,3-butanediol, triethylene glycol, tetraethylene glycol, polyethylene glycol 200, and sulfolane are particularly suitable for the satisfaction of the earlier-described ranges of the water permeability under external pressure and particle blocking rate of the polyamide hollow fiber.

In the case where the pore size is desired to be as small as 10 nm or less, a poor solvent or a mixture of a poor solvent and another solvent is preferably used. Specific examples of the poor solvent are preferably polyethylene glycol 300 and polyethylene glycol 400. The use of polyethylene glycol 300 or polyethylene glycol 400, or a mixture of polyethylene glycol 300 or polyethylene glycol 400 and another solvent, allows the polyamide hollow fiber membrane of the present invention to have a small pore size while keeping a high water permeability and to trap even smaller particles.

In the Second Step, a coagulation bath containing a polyhydric alcohol or a mixture of a polyhydric alcohol and water is used as the coagulation bath. The use of such a coagulation bath makes it possible to form a polyamide hollow fiber having the earlier-described properties. Specific examples of a polyhydric alcohol for use in the coagulation bath include glycerin, ethylene glycol, propylene glycol, butylene glycol, diethylene glycol, dipropylene glycol, diglycerin, triethylene glycol, tetraethylene glycol, polyethylene glycol (200 to 400), 1,3-butanediol, and the like. Of these polyhydric alcohols, particularly suitable for the satisfaction of the earlier-described ranges of the water permeability under external pressure and particle blocking rate of the polyamide hollow fiber are glycerin, ethylene glycol, diethylene glycol, propylene glycol, 1,3-butanediol, and polyethylene glycol 200. These polyhydric alcohols may be used individually or two or more of them may be used in combination.

In the case where the coagulation bath is a mixture of a polyhydric alcohol and water, the mixing ratio of these is not particularly limited. For example, the mass ratio of polyhydric alcohol:water is 25 to 80:75 to 20, preferably 40 to 70:60 to 30.

The temperature of the coagulation bath is not particularly limited, and usually −20 to 100° C., preferably −10 to 80° C., more preferably 0 to 40° C., for example. A change in temperature of the coagulation bath changes the speed of crystallization, and therefore makes it possible to change pore size, water permeability, and strength. Generally, lower temperatures of the coagulation bath tend to reduce pore size, reduce water permeability, and increase strength, whereas higher temperatures of the coagulation bath tend to increase pore size, increase water permeability, and reduce strength. However, these tendencies may change also depending on the solubility of the solvent contained in the liquid for membrane formation with the inner fluid and the speed of crystallization of the resin itself. For the purpose of satisfying the earlier-described water permeability under external pressure and particle blocking rate of the polyamide hollow fiber, the coagulation bath preferably has a low temperature. However, the coagulation bath does not necessarily have to have a low temperature, under certain conditions. In the case where the temperature of the coagulation bath is within the above-described range, it is possible to satisfy the earlier-described ranges of water permeability under external pressure and particle blocking rate of the polyamide hollow fiber, increase the strength of the membrane, and also reduce energy required for temperature control.

The flow rate of the liquid for membrane formation discharged from the outer annular nozzle of the double-pipe nozzle for hollow fiber production is not particularly limited, and, for example, 2 to 20 g/min., preferably 3 to 15 g/min., more preferably 4 to 10 g/min. The flow rate of the inner fluid is adjusted appropriately in consideration of the diameter of the inner nozzle of the double-pipe nozzle for hollow fiber production, type of inner fluid to be used, flow rate of the liquid for membrane formation, and the like. The flow rate of the inner fluid is, for example, 0.1 to 2 times, preferably 0.2 to 1 times, more preferably 0.4 to 0.7 times the flow rate of the liquid for membrane formation.

By performing the Second Step in this way, the liquid for membrane formation discharged from the double-pipe nozzle for hollow fiber production solidifies in the coagulation bath and forms a polyamide hollow fiber membrane.

Third Step

In the Third Step, the organic solvent is removed from the hollow fiber membrane formed in the Second Step. The method of removing the organic solvent from the hollow fiber membrane is not particularly limited, and may be a method to vaporize the organic solvent by drying with a dryer. However, it is preferable to employ a method by which to immerse the hollow fiber membrane in an extractant thereby extracting and removing the organic solvent that is phase-separated in the hollow fiber membrane. The extractant for use in extraction and removal of the organic solvent is preferably a reasonable extractant that has a low boiling point and thus can be readily separated utilizing the difference in boiling points after the extraction. Examples of the extractant include water, methanol, ethanol, isopropanol, acetone, diethyl ether, hexane, petroleum ether, toluene, and the like. Preferred extractants include water, methanol, ethanol, isopropanol, and acetone, and a more preferred extractant is water. In the case where an organic solvent insoluble in water, such as phthalic acid ester, fatty acid, or the like, is to be extracted, a suitable extractant is isopropyl alcohol, petroleum ether, or the like. Furthermore, the time during which the hollow fiber membrane is immersed in the extractant is not particularly limited, and is, for example, 0.2 hour to 2 months, preferably 0.5 hour to 1 month, more preferably 2 hours to 10 days. The extractant may be replaced or stirred for the purpose of effective extraction and removal of the organic solvent remaining in the polyamide hollow fiber. In particular, in the case where the polyamide hollow fiber membrane of the present invention is used in semiconductor industry, food industry, or water purification, it is desirable that the Third Step be thoroughly performed over time because remaining impurities (metal), organic solvent, and the like are problematic.

When the Third Step is performed in this way, a polyamide hollow fiber membrane of the present invention is produced.

Figure 3:
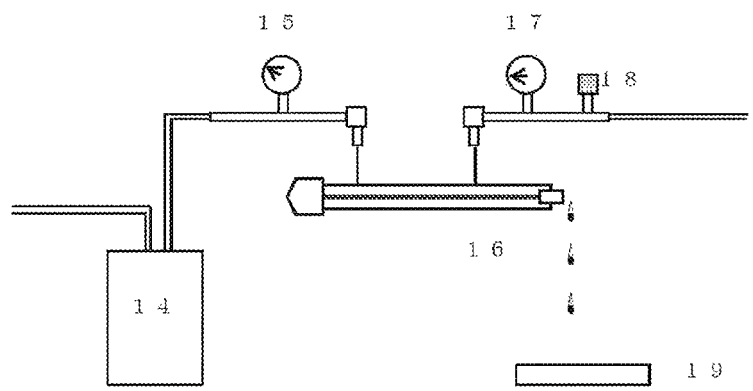
FIG. 3 is an illustration of an apparatus which shows one embodiment of a method for producing a polyamide hollow fiber membrane of the present invention.

The apparatus used in the production of the polyamide hollow fiber membrane of the present invention is not particularly limited, provided that the polyamide hollow fiber membrane is produced through the above-described First to Third Steps. A preferable apparatus is, for example, a general apparatus for use in dry-wet spinning as illustrated in FIG. 3. The following description roughly discusses a production flow for the polyamide hollow fiber membrane of the present invention with reference to the apparatus illustrated in FIG. 3 as an example. The liquid for membrane formation prepared in the First Step is stored in a container 3. Alternatively, the First Step may be performed in the container 3 to obtain the liquid for membrane formation. The liquid for membrane formation stored in the container 3 and the inner fluid introduced through an inner fluid inlet 5 are each measured with a metering pump 4, and transferred to a double-pipe nozzle for hollow fiber production (spinneret) 6. The liquid for membrane formation discharged from the double-pipe nozzle for hollow fiber production (spinneret) 6 is introduced into a coagulation bath 7 through a small air gap, and is cooled to solidify. While the liquid for membrane formation is cooled to solidify, a heat-induced phase separation occurs and a polyamide hollow fiber membrane 8 having a sea-island structure is obtained. The polyamide hollow fiber membrane 8 thus obtained is taken up with a winder 9, while being taken up on a bobbin winder 10 provided with a bobbin. While the polyamide hollow fiber membrane 8 is wound onto the bobbin, a cleaning shower 11 removes the solvent of the coagulation bath, the organic solvent that is an island component of the sea-island structure remaining in the hollow fiber membrane, and the inner fluid in the hollow portion, whereby a polyamide hollow fiber membrane is obtained.

3. Hollow Fiber Membrane Module Including Polyamide Hollow Fiber Membrane

A polyamide hollow fiber membrane of the present invention is stored in a module case having an inlet for a liquid to be treated, an outlet for a filtrate, and the like, to be suitably used as a filtration filter. This is used as a hollow fiber membrane module.

Specifically, the hollow fiber membrane module is not limited, provided that it is configured such that a bundle of polyamide hollow fiber membranes of the present invention is stored in the module case and one or both ends of the bundle of polyamide hollow fiber membranes is sealed and fixed with a potting agent. The hollow fiber membrane module is not limited, provided that it has, as an inlet for a liquid to be treated and an outlet for a filtrate, (i) an opening communicated with a flow path outside the walls of the polyamide hollow fiber membranes and (ii) an opening communicated with the hollow portions of the polyamide hollow fiber membranes.

The hollow fiber membrane module is not particularly limited in shape, and may be a dead-end module or a crossflow module. Specific examples of the shape of the hollow fiber membrane module include: a dead-end module configured such that a bundle of hollow fiber membranes is bent in a U-shape and filled in a module case and the ends of the bundle are sealed and cut thereafter so that the bundle has openings; a dead-end module configured such that the openings of a bundle of hollow fiber membranes at one end are closed with a heat seal or the like, this bundle is filled straight in a module case, and the open end of the bundle is sealed and cut thereafter so that the end has openings; a dead-end module configured such that a bundle of hollow fiber membranes is filled straight in a module case, the both ends of the bundle are sealed, and only one end is cut so that the openings are exposed; a crossflow module configured such that a bundle of hollow fiber membranes is filled straight in a module case, the both ends of the bundle are sealed, the sealed ends of the bundle are cut, and two flow paths are provided in the side face of the filter case; and the like.

The filling rate of polyamide hollow fiber membranes in the module case is not particularly limited. For example, the volume of polyamide hollow fiber membranes, including the volume of the hollow portions, with respect to the volume of the inner space of the module case is 30 to 90 vol. %, preferably 35 to 75 vol. %, more preferably 40 to 65 vol. %. In the case where such a filling rate is satisfied, it is possible to fill the polyamide hollow fiber membranes readily in the module case and allow a fluid to flow readily between hollow fiber membranes while keeping a large-enough filtration area.

The potting agent for use in the production of the hollow fiber membrane module is not limited to a particular kind. Examples of the potting agent include polyurethane resin, epoxy resin, polyamide, silicone resin, melamine resin, polyethylene, polypropylene, phenol resin, polyimide, polyurea resin, and the like. Of these potting agents, preferred are agents which shrink or swell to a small extent when cured and are not too hard. Suitable examples of the potting agent include polyurethane resin, epoxy resin, polyamide, silicone resin, and polyethylene. More preferred potting agents are polyurethane resin, epoxy resin, and polyamide. These potting agents may be used individually or two or more of them may be used in combination.

The material for the module case for use in the hollow fiber membrane module is not particularly limited. Examples of the material include polyamide, polyester, polyethylene, polypropylene, polyvinylidene fluoride, polytetrafluoroethylene, polyvinyl chloride, polysulfone, polyether sulfone, polycarbonate, polyarylate, polyphenylene sulfide, and the like. Of these agents, preferred are polyamide, polyethylene, polypropylene, polytetrafluoroethylene, polycarbonate, polysulfone, and polyether sulfone. More preferred are polyamide, polyethylene, polypropylene, and polytetrafluoroethylene.

The hollow fiber membrane module including the polyamide hollow fiber membrane of the present invention is for use in purification of water, removal of impurities, and the like, in the fields of semiconductor industry, food industry, pharmaceutical industry, medical industry, and the like. In particular, it is believed that, in the filtration of photoresist in semiconductor industry, an impurity equal to or larger than one-tenth the width of a trace on a microchip would cause deficiency (Non-patent Document: M. Yang, D. L. Tolliver, The Journal of Environmental sciences 32(4), 35-42 (1989)). As miniaturization of the traces has progressed in recent years, the polyamide hollow fiber membrane module of the present invention, which has a fine structure and is highly hydrophilic, is very useful. Furthermore, in the field of pharmaceutical industry, it is an important objective to remove viruses in the production of blood products and biomedicine. For example, the polyamide hollow fiber membrane module of the present invention is suitable for use in removal of viruses as small as approximately 20 to 25 nm such as parvoviruses.

EXAMPLES

The following description more specifically discusses the present invention with reference to Examples. Note, however, that the present invention is not intended to be limited to these examples.

It should be noted that, in Examples, the physical properties of a hollow fiber membrane were measured in the following manner.

Contact Angle

The contact angle to water was measured by the earlier-described method with the use of an automatic contact angle meter DM-500 available from Kyowa Interface Science Co., LTD.

Water Permeability Under External Pressure

Water permeability under external pressure was measured by the earlier-described method with the use of the apparatus illustrated in FIG. 1.

Particle Blocking Rate

Particle blocking rate was measured by the earlier-described method with the use of colloidal gold particles having the following particle sizes.

50 nm: Product name "Gold colloid-50 nm" (available from British BioCell International, Ltd.)

20 nm: Product name "Gold colloid-20 nm" (available from British BioCell International, Ltd.)

10 nm: Product name "Gold colloid-10 nm" (available from British BioCell International, Ltd.)

5 nm: Product name "Gold colloid-5 nm" (available from British BioCell International, Ltd.)

Inside Diameter and Outside Diameter of Polyamide Hollow Fiber Membrane

The inside diameter and outside diameter of a polyamide hollow fiber membrane were found by: measuring a cross section of the polyamide hollow fiber membrane at a magnification of ×200 with an optical microscope; and calculating the mean of n=3.

Metal Element Content of Polyamide Hollow Fiber Membrane 0.5 g of a dry polyamide hollow fiber membrane was mixed with 5 ml of nitric acid, and decomposed by microwave wet digestion by heating at 150° C. for 10 minutes and 180° C. for 15 minutes to obtain a sample. The metal element content of the sample was measured with an ICP-atomic emission spectrophotometer iCAP6500Duo available from Thermo Fisher Scientific K.K.

Example 1

A liquid for membrane formation was prepared by stirring 260 g of polyamide 6 chips (A1030BRT available from UNITIKA LTD., relative viscosity 3.53), 197 g of sulfolane (available from Tokyo Chemical Industry), and 543 g of dimethylsulfone (available from Tokyo Chemical Industry) at 180° C. for 1.5 hours to dissolve the chips. The liquid for membrane formation was transferred to a spinneret (a double-pipe nozzle for hollow fiber production having a double-pipe structure) through a metering pump, and extruded at 5 g/min. The spinneret had an outside diameter of 1.5 mm and an inside diameter of 0.6 mm. Glycerin was used as an inner fluid, and was passed at a rate of 2.0 g/min. The extruded liquid for spinning was introduced into a coagulation bath containing a 5° C. 50 mass % propylene glycol solution through an air gap of 10 mm, cooled to solidify, and taken up at a take-up speed of 20 m/min. The obtained hollow fiber was immersed in water for 24 hours, whereby the solvent was extracted, and thereafter the hollow fiber was dried with a hot-air dryer at 50° C. for 1 hour. In this way, a polyamide hollow fiber membrane was obtained.

Figure 4:
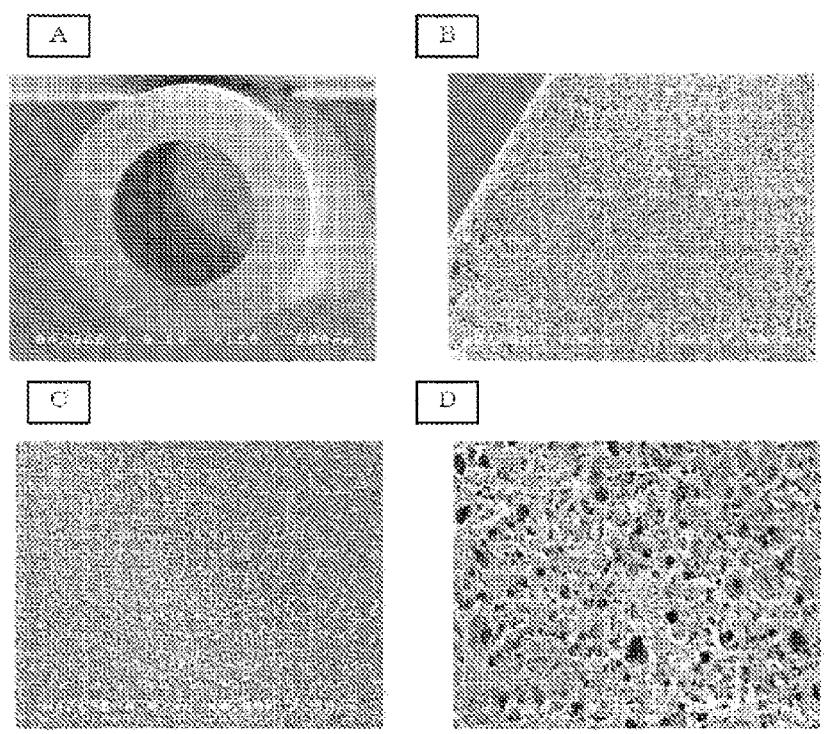
FIG. 4 shows photographs of a polyamide hollow fiber membrane obtained in Example 1, which are taken under a scanning electron microscope. A is a photograph of a cross section, B is an enlarged photograph of the cross section, C is a photograph of the inside surface, and D is a photograph of the outside surface.

The obtained polyamide hollow fiber membrane had an outside diameter of 550 μm and an inside diameter of 300 μm. The performance was as follows, as shown in Table 1: contact angle was 52°, water permeability under external pressure was 450 L/(m²·atm·h), and 10 nm particle blocking rate was 93%. The obtained hollow fiber membrane had a breaking strength of 12 MPa, an elongation at break of 200%, and a tensile modulus of 80.0 MPa. Electron micrographs of the obtained hollow fiber membrane are shown in FIG. 4. Observation showed that the cross section had densely arranged pores of the same size and had no macrovoids. A lot of densely arranged pores were observed in both the inside surface and the outside surface.

The results obtained by measuring the metal element content of the polyamide hollow fiber membrane by ICP-atomic emission spectroscopy are shown in Table 2. The results showed that most metal elements were not detected, and even the concentration of the metal element contained in a large amount was as low as approximately 4 ppm.

Example 2

A polyamide hollow fiber membrane was prepared in the same manner as in Example 1, except that the coagulation bath was changed to a 5° C. 50 mass % glycerin. As shown in Table 1, the obtained polyamide hollow fiber membrane had a contact angle of 520, water permeability of 410 L/(m²·atm·h), and 10 nm particle blocking rate of 98%.

Example 3

A polyamide hollow fiber membrane was prepared in the same manner as in Example 1, except that the coagulation bath was changed to an equal-weight mixture of glycerin and ethylene glycol. As shown in Table 1, the obtained polyamide hollow fiber membrane had a contact angle of 52°, water permeability under external pressure of 200 L/(m²·atm·h), and 10 nm particle blocking rate of 94%.

Example 4

A polyamide hollow fiber membrane was obtained in the same manner as in Example 1, except that the liquid for membrane formation was extruded at 10 g/min., the inner fluid was transferred at 4 g/min., and the take-up speed was 40 m/min. The obtained polyamide hollow fiber membrane had an outside diameter of 540 μm and an inside diameter of 290 μm. As shown in Table 1, the performance was as follows: the contact angle was 52°, water permeability under external pressure was 560 L/(m²·atm·h), and 10 nm particle blocking rate was 90%.

Example 5

A polyamide hollow fiber membrane was prepared in the same manner as in Example 1, except that the solvent for the liquid for membrane formation was 740 g of sulfolane. As shown in Table 1, the obtained polyamide hollow fiber membrane had a contact angle of 53°, water permeability under external pressure of 400 L/(m²·atm·h), 10 nm particle blocking rate of 61%, and 20 nm particle blocking rate of 98%.

Example 6

A polyamide hollow fiber membrane was prepared in the same manner as in Example 1, except that the solvent for the liquid for membrane formation was 740 g of γ-butyrolactone. As shown in Table 1, the obtained polyamide hollow fiber membrane had a contact angle of 53°, water permeability under external pressure of 350 L/(m²·atm·h), 10 nm particle blocking rate of 85%, and 20 nm particle blocking rate of 94%.

Example 7

A polyamide hollow fiber membrane was prepared in the same manner as in Example 1, except that, in preparation of the liquid for membrane formation, the amount of polyamide 6 chips was 230 g and the solvent was 770 g of sulfolane. As shown in Table 1, the obtained polyamide hollow fiber membrane had a contact angle of 53°, water permeability under external pressure of 720 L/(m²·atm·h), 10 nm particle blocking rate of 81%, and 20 nm particle blocking rate of 97%.

Example 8

A polyamide hollow fiber membrane was prepared in the same manner as in Example 1, except that, in preparation of the liquid for membrane formation, the amount of polyamide 6 chips was 210 g and the solvent was 211 g of sulfolane and 579 g of dimethylsulfone. As shown in Table 1, the obtained polyamide hollow fiber membrane had a contact angle of 50°, water permeability under external pressure of 940 L/(m²·atm·h), 20 nm particle blocking rate of 20%, and 50 nm particle blocking rate of 99%.

Example 9

A polyamide hollow fiber membrane was prepared in the same manner as in Example 1, except that, in preparation of the liquid for membrane formation, the amount of polyamide 6 chips was 300 g and the solvent was 187 g of sulfolane and 513 g of dimethylsulfone. As shown in Table 1, the obtained polyamide hollow fiber membrane had a contact angle of 55°, water permeability under external pressure of 70 L/(m²·atm·h), 5 nm particle blocking rate of 93%, and 10 nm particle blocking rate of 99%.

Example 10

A polyamide hollow fiber membrane was prepared in the same manner as in Example 1, except that, in preparation of the liquid for membrane formation, the amount of polyamide 6 chips was 350 g and the solvent was 173 g of sulfolane and 477 g of dimethylsulfone, and the membrane was formed by passing the liquid for membrane formation at 4 g/min. and passing the inner fluid at 2.5 g/min. The obtained polyamide hollow fiber membrane had an outside diameter of 490 μm and an inside diameter of 320 μm, and, as shown in Table 1, the contact angle was 55°, water permeability under external pressure was 53 L/(m²·atm·h), 5 nm particle blocking rate was 98%, and 10 nm particle blocking rate was 100%.

Example 11

A polyamide hollow fiber membrane was prepared in the same manner as in Example 1, except that, in preparation of the liquid for membrane formation, the amount of polyamide 6 chips was 280 g and the solvent was 192 g of sulfolane and 528 g of dimethylsulfone, and the membrane was formed by passing the liquid for membrane formation at 4 g/min. and passing the inner fluid, which was changed to glycerin:polyethylene glycol 300=75:25, at 2.5 g/min. The obtained polyamide hollow fiber membrane had an outside diameter of 500 μm and an inside diameter of 300 μm, and, as shown in Table 1, the contact angle was 54°, water permeability under external pressure was 280 L/(m²·atm·h), 5 nm particle blocking rate was 93%, and 10 nm particle blocking rate was 100%.

Example 12

A polyamide hollow fiber membrane was prepared in the same manner as in Example 11, except that the liquid for membrane formation was passed at 8 g/min. and the inner fluid was passed at 5 g/min., and the membrane was formed at a take-up speed of 40 m/min. The obtained polyamide hollow fiber membrane had an outside diameter of 500 μm and an inside diameter of 310 μm. As shown in Table 1, the performance was as follows: the contact angle was 52°, water permeability under external pressure was 310 L/(m²·atm·h), 5 nm particle blocking rate was 92%, and 10 nm particle blocking rate was 100%.

Example 13

A hollow fiber membrane was prepared in the same manner as in Example 1, except that the inner fluid was changed to polyethylene glycol 200. As shown in Table 1, the obtained hollow fiber membrane had a contact angle of 510, water permeability under external pressure of 550 L/(m²·atm·h), and 10 μm particle blocking rate of 91%.

Example 14

A polyamide hollow fiber membrane was prepared in the same manner as in Example 1, except that the inner fluid was changed to sulfolane. As shown in Table 1, the obtained polyamide hollow fiber membrane had a contact angle of 53°, water permeability under external pressure of 330 L/(m²·atm·h), and 10 nm particle blocking rate of 94%.

Example 15

A polyamide hollow fiber membrane was prepared in the same manner as in Example 1, except that the coagulation bath was changed to 100 mass % propylene glycol. As shown in Table 1, the obtained polyamide hollow fiber membrane had a contact angle of 52°, water permeability under external pressure of 550 L/(m²·atm·h), and 10 nm particle blocking rate of 92%.

Example 16

A polyamide hollow fiber membrane was prepared in the same manner as in Example 1, except that, in the preparation of the liquid for membrane formation, polyamide 610 chips (CM2001 available from TORAY INDUSTRIES, INC.) were used as a polyamide resin. As shown in Table 1, the obtained polyamide hollow fiber membrane had a contact angle of 68°, water permeability under external pressure of 200 L/(m²·atm·h), and 10 nm particle blocking rate of 99%.

Example 17

A polyamide hollow fiber membrane was prepared in the same manner as in Example 1, except that, in the preparation of the liquid for membrane formation, polyamide MXD6 chips (S6121 available from MITSUBISHI GAS CHEMICAL COMPANY, INC.) were used as a polyamide resin. As shown in Table 1, the obtained polyamide hollow fiber membrane had a contact angle of 72°, water permeability under external pressure of 320 L/(m²·atm·h), and 10 nm particle blocking rate of 95%.

Comparative Example 1

A polyamide hollow fiber membrane was prepared in the same manner as in Example 1, except that, in the preparation of the liquid for membrane formation, polyamide 12 chips (Rilsan AECNOTL available from Arkema, relative viscosity 2.25) were used as a polyamide resin. As shown in Table 1, the obtained polyamide hollow fiber membrane had a contact angle of as large as 95° and water permeability under external pressure of as low as 30 L/(m²·atm·h). The 10 nm particle blocking rate was 100%.

Comparative Example 2

A polyamide hollow fiber membrane was prepared in the same manner as in Example 1, except that, in the preparation of the liquid for membrane formation, polyamide 6 was used in an amount of 190 g, sulfolane was used in an amount of 216 g, and dimethylsulfone was used in an amount of 594 g. As shown in Table 1, the obtained polyamide hollow fiber membrane had a contact angle of 51° and water permeability under external pressure of as high as 1170 L/(m²·atm·h). However, the 50 nm particle blocking rate was 76%.

Comparative Example 3

A polyamide hollow fiber membrane was prepared in the same manner as in Example 1, except that, in the preparation of the liquid for membrane formation, polyamide 6 was used in an amount of 410 g, sulfolane was used in an amount of 157 g, and dimethylsulfone was used in an amount of 433 g. As shown in Table 1, the obtained polyamide hollow fiber membrane had a contact angle of 55°. It should be noted that, although the measurement of water permeability under external pressure was tried, water did not pass through the membrane even when a pressure of up to 0.3 MPa was applied.

Comparative Example 4

A polyamide hollow fiber membrane was prepared in the same manner as in Example 1, except that the coagulation bath was changed to 5° C. water. As shown in Table 1, the obtained polyamide hollow fiber membrane had a contact angle of 55° and water permeability under external pressure of as low as 20 L/(m²·atm·h). The 10 nm particle blocking rate was 99%.

Comparative Examples 5 to 17

The preparation of a polyamide hollow fiber membrane was tried in the same manner as in Example 1, except that the solvent for the liquid for membrane formation was changed to 1-propanol (Comparative Example 5), isopropanol (Comparative Example 6), n-butanol (Comparative Example 7), tetrahydrofuran (Comparative Example 8), chloroform (Comparative Example 9), acetone (Comparative Example 10), methyl ethyl ketone (Comparative Example 11), methyl isobutyl ketone (Comparative Example 12), hexane (Comparative Example 13), toluene (Comparative Example 14), cyclohexane (Comparative Example 15), pyridine (Comparative Example 16), or ethyl acetate (Comparative Example 17). However, all these solvents had too low a boiling point to dissolve a polyamide resin, and therefore even when each mixture was stirred at a temperature 5° C. which was lower than the boiling point, the polyamide resin did not dissolve uniformly. It was not possible to form a polyamide hollow fiber membrane.

Summary of Physical Properties of Polyamide Hollow Fiber Membranes

Table 1 shows both the production conditions and physical properties of the polyamide hollow fiber membranes of Examples 1 to 17 and the polyamide hollow fiber membranes of Comparative Examples 1 to 4. The results showed that, by employing particular compositions of the liquid for membrane formation, inner fluid, and coagulation bath, it is possible to obtain a high-performance polyamide hollow fiber membrane having a contact angle to water of not more than 80°, water permeability under external pressure of not less than 50 L/(m²·atm·h), and 50 nm particle blocking rate of not less than 90% (refer to Examples 1 to 17).

TABLE 1

| | Polyamide | | Organic solvent | | | Take-up | |
| --- | --- | --- | --- | --- | --- | --- | --- |
| | Type | Use amount | Type | Use amount | Inner fluid | speed (m/min.) | Coagulation bath |
| Example 1 | PA6 | 260 g | Dimethylsulfone Sulfolane | 197 g 543 g | Glycerin | 20 | 60% propylene glycol |

TABLE 1-continued

| | | | | | | | |
|---|---|---|---|---|---|---|---|
| Example 2 | PA6 | 260 g | Dimethylsulfone Sulfolane | 197 g 543 g | Glycerin | 20 | 50% Glycerin |
| Example 3 | PA6 | 260 g | Dimethylsulfone Sulfolane | 197 g 543 g | Glycerin | 20 | Glycerin:ethylene glycol = 1:1 |
| Example 4 | PA6 | 260 g | Dimethylsulfone Sulfolane | 197 g 543 g | Glycerin | 40 | 60% propylene glycol |
| Example 5 | PA6 | 260 g | Sulfolane | 740 g | Glycerin | 20 | 60% propylene glycol |
| Example 6 | PA6 | 260 g | γ-butyrolactone | 740 g | Glycerin | 20 | 60% propylene glycol |
| Example 7 | PA6 | 230 g | Sulfolane | 770 g | Glycerin | 20 | 60% propylene glycol |
| Example 8 | PA6 | 210 g | Dimethylsulfone Sulfolane | 579 g 211 g | Glycerin | 20 | 60% propylene glycol |
| Example 9 | PA6 | 300 g | Dimethylsulfone Sulfolane | 513 g 187 g | Glycerin | 20 | 60% propylene glycol |
| Example 10 | PA6 | 350 g | Dimethylsulfone Sulfolane | 477 g 173 g | Glycerin | 20 | 60% propylene glycol |
| Example 11 | PA6 | 280 g | Dimethylsulfone Sulfolane | 528 g 192 g | Glycerin:PEG300 = 75:25 | 20 | 60% propylene glycol |
| Example 12 | PA6 | 280 g | Dimethylsulfone Sulfolane | 528 g 192 g | Glycerin:PEG300 = 75:25 | 40 | 60% propylene glycol |
| Example 13 | PA6 | 260 g | Dimethylsulfone Sulfolane | 543 g 197 g | PEG200 | 20 | 60% propylene glycol |
| Example 14 | PA6 | 260 g | Dimethylsulfone Sulfolane | 543 g 197 g | Sulfolane | 20 | 60% propylene glycol |
| Example 15 | PA6 | 260 g | Sulfolane | 543 g 197 g | Glycerin | 20 | 100% propylene glycol |
| Example 16 | PA610 | 260 g | Dimethylsulfone | 543 g 197 g | Glycerin | 20 | 60% propylene glycol |
| Example 17 | MXD6 | 260 g | Sulfolane | 543 g 197 g | Glycerin | 20 | 60% propylene glycol |
| Comparative Example 1 | PA12 | 260 g | Dimethylsulfone | 543 g 197 g | Glycerin | 20 | 60% propylene glycol |
| Comparative Example 2 | PA6 | 190 g | Dimethylsulfone Sulfolane | 594 g 216 g | Glycerin | 20 | 60% propylene glycol |
| Comparative Example 3 | PA6 | 410 g | Dimethylsulfone Sulfolane | 433 g 157 g | Glycerin | 20 | 60% propylene glycol |
| Comparative Example 4 | PA6 | 260 g | Dimethylsulfone Sulfolane | 197 g 543 g | Glycerin | 20 | Water |

| | Contact angle (°) | Water permeability under external pressure [L/(m² · atm · h)] | Blocking rate (%) | | | |
|---|---|---|---|---|---|---|
| | | | 5 nm | 10 nm | 20 nm | 50 nm |
| Example 1 | 52 | 450 | 62 | 93 | 100 | 100 |
| Example 2 | 52 | 410 | 75 | 98 | 100 | 100 |
| Example 3 | 52 | 200 | 68 | 94 | 100 | 100 |
| Example 4 | 52 | 560 | 59 | 90 | 100 | 100 |
| Example 5 | 53 | 400 | 25 | 61 | 98 | 100 |
| Example 6 | 53 | 350 | 52 | 85 | 94 | 99 |
| Example 7 | 53 | 720 | 50 | 81 | 97 | 100 |
| Example 8 | 50 | 1530 | 5 | 12 | 20 | 99 |
| Example 9 | 55 | 70 | 93 | 99 | 100 | 100 |
| Example 10 | 55 | 53 | 98 | 100 | 100 | 100 |
| Example 11 | 54 | 280 | 93 | 100 | 100 | 100 |
| Example 12 | 52 | 310 | 92 | 100 | 100 | 100 |
| Example 13 | 51 | 550 | 62 | 91 | 99 | 100 |
| Example 14 | 53 | 330 | 70 | 94 | 100 | 100 |
| Example 15 | 52 | 550 | 71 | 92 | 100 | 100 |
| Example 16 | 68 | 200 | 85 | 99 | 100 | 100 |
| Example 17 | 72 | 320 | 75 | 95 | 100 | 100 |
| Comparative Example 1 | 95 | 30 | 91 | 100 | 100 | 100 |
| Comparative Example 2 | 51 | 1170 | 2 | 5 | 35 | 76 |
| Comparative Example 3 | 55 | 0 | — | — | — | — |
| Comparative Example 4 | 55 | 20 | 96 | 99 | 100 | 100 |

PA6 denotes polyamide 6 (—CH$_2$—:—NHCO— = 5:1)
PA610 denotes polyamide 610 (—CH$_2$—:—NHCO— = 7:1)
MXD6 denotes polyamide MXD6 (—CH$_2$—, —CN—, —C=:—NHCO— = 6:1)
PA12 denotes polyamide 12 (—CH$_2$—:—NHCO— = 11:1)

TABLE 2

| Element | Concentration (ppm) | Element | Concentration (ppm) | Element | Concentration (ppm) | Element | Concentration (ppm) | Element | Concentration (ppm) |
|---|---|---|---|---|---|---|---|---|---|
| Ag | 0.0 | Al | 0.0 | As | 0.0 | Au | 0.0 | B | 0.0 |
| Ba | 0.0 | Be | 0.0 | Bi | 0.0 | Ca | 2.6 | Cd | 0.0 |
| Ce | 0.0 | Co | 0.0 | Cr | 1.0 | Cu | 0.2 | Dy | 0.0 |
| Er | 0.0 | Eu | 0.0 | Fe | 4.4 | Ga | 0.0 | Gd | 0.0 |
| Ge | 0.0 | Hf | 0.0 | Hg | 0.0 | Ho | 0.0 | In | 0.0 |
| Ir | 0.0 | K | 0.2 | La | 0.0 | Li | 0.0 | Lu | 0.0 |
| Mg | 0.6 | Mn | 0.0 | Mo | 0.0 | Na | 3.6 | Nb | 0.0 |
| Nd | 0.0 | Ni | 0.0 | P | 0.0 | Pb | 0.0 | Pd | 0.0 |
| Pr | 0.0 | Pt | 0.0 | Re | 0.0 | Rh | 0.0 | Ru | 0.0 |
| Sb | 0.0 | Sc | 0.0 | Se | 0.0 | Si | 1.4 | Sm | 0.0 |
| Sn | 0.0 | Sr | 0.0 | Ta | 0.0 | Tb | 0.0 | Te | 0.0 |
| Ti | 0.1 | Tl | 0.0 | Tm | 0.0 | V | 0.0 | W | 0.0 |
| Y | 0.0 | Yb | 0.0 | Zn | 0.3 | Zr | 0.0 | | |

Example 18

Preparation of Crossflow Module

Figure 5:
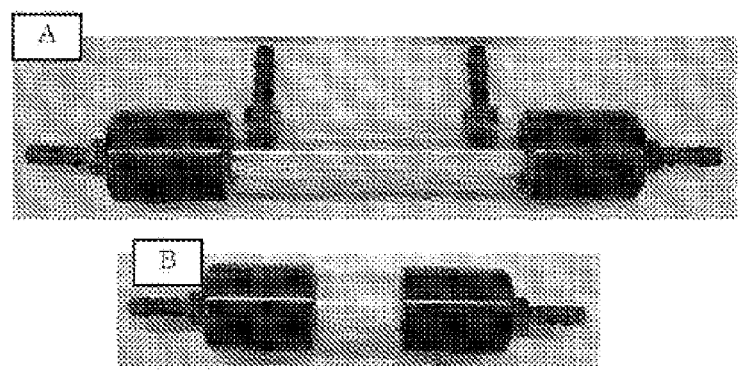
FIG. 5A is a photograph of the appearance of a crossflow hollow fiber membrane module obtained in Example 15.
FIG. 5B is a photograph of the appearance of a dead-end hollow fiber membrane module obtained in Example 16.

The hollow fiber membrane obtained in Example 1 was cut into a length of 250 mm, and the both ends of a bundle of 50 membranes were fused and sealed with a heat sealer. A module case prepared was a circular pipe made of vinyl chloride, which has water openings in the positions 35 mm away from the respective opposite ends and has an outside diameter of 20 mm, an inside diameter of 17 mm, and a length of 140 mm. Next, a two-component polyurethane potting agent available from SANYU REC CO., LTD. was put in a polytetrafluoroethylene (PTFE) pot having the same outside and inside diameters as the module case and having a length of 25 mm and leveled off, one end of the module case was attached to the top, and the bundle of membranes was pushed into the PTFE pot from above until the bundle made contact with the bottom of the PTFE pot. The bundle in this state was allowed to stand for 10 hours, whereby the end was potted. After the curing, the bundle was pulled out by pulling the PTFE pot, the polyurethane resin projecting out of the module case was cut together with the bundle of membranes, whereby the hollow portions were exposed. The other end of the bundle was also potted and cut. In this way, the hollow portions were exposed at both ends. The both ends were covered with caps having water openings and bonded with the caps, whereby a crossflow module was prepared (refer to FIG. 5A). The effective membrane length of the crossflow module was 115 mm×50 membranes.

Example 19: Preparation of Dead-End Module

The hollow fiber membrane obtained in Example 1 was cut into a length of 200 mm, and a bundle of 50 membranes was bent into a U-shape and its ends were fused and sealed with a heat sealer. A module case prepared was a circular pipe made of vinyl chloride, which has an outside diameter of 20 mm, an inside diameter of 17 mm, and a length of 60 mm. Next, a two-component polyurethane potting agent available from SANYU REC CO., LTD. was put in a PTFE pot having the same outside and inside diameters as the module case and having a length of 25 mm and levelled off, one end of the filter case was attached to the top, and the sealed portion of the U-shaped bundle was pushed into the PTFE pot from above until the bundle made contact with the bottom of the PTFE pot. The bundle in this state was allowed to stand for 10 hours, whereby the portion was potted. After the curing, the bundle was pulled out by pulling the PTFE pot, the polyurethane resin projecting out of the module case was cut together with the bundle of membranes, whereby the hollow portions were exposed. The both ends of the module case were covered with caps having water openings and bonded with the caps, whereby a dead-end module was prepared (refer to FIG. 5B). The effective membrane length of the dead-end module was 80 mm×50 membranes.

DESCRIPTION OF REFERENCE SIGNS

1: Stirring motor
2: Inlet for pressure gas
3: Container
4: Metering pump
5: Inlet for inner fluid
6: Double-pipe nozzle for hollow fiber production (spinneret)
7: Coagulation bath
8: Polyimide hollow fiber membrane
9: Winder
10: Bobbin winder
11: Cleaning shower
12: Inner nozzle (nozzle portion through which inner fluid is to be discharged)
13: Outer annular nozzle (nozzle portion through which liquid for membrane formation is to be discharged)
14: Liquid pump
15: Inlet pressure meter
16: Hollow fiber membrane
17: Outlet pressure meter
18: Outlet valve
19: Receiving tray
20: Cap
21: Exit opening

What is claimed is:

1. A polyamide hollow fiber membrane comprising the following properties (1) to (4):
    (1) the polyamide hollow fiber membrane comprises a polyamide resin having methylene and amide groups at a molar ratio of —$CH_2$—:—NHCO—=4:1 to 10:1;
    (2) a contact angle between water and a surface of the polyamide hollow fiber membrane is not more than 80°;
    (3) a water permeability under external pressure is not less than 50 L/(m²·atm·h); and
    (4) a 10 nm particle blocking rate is not less than 90%.

2. The polyamide hollow fiber membrane according to claim 1, wherein the polyamide resin is at least one selected from the group consisting of polyamide 6, polyamide 66, polyamide 46, polyamide 610, polyamide 11, and polyamide MXD6.

3. The polyamide hollow fiber membrane according to claim 1, which has a 5 nm particle blocking rate of not less than 90%.

4. The polyamide hollow fiber membrane of claim 1, which has a water permeability under external pressure of not less than 150 $L/(m^2 \cdot atm \cdot h)$.

5. The polyamide hollow fiber membrane of claim 1, which has a water permeability under external pressure of not less than 250 $L/(m^2 \cdot atm \cdot h)$.

6. The polyamide hollow fiber membrane of claim 1, wherein a metal content for each metal element is not more than 10 ppm.

7. A hollow fiber membrane module comprising: a module case; and the polyamide hollow fiber membrane described in claim 1 stored in the module case.

* * * * *